(12) United States Patent
Frelechoux et al.

(10) Patent No.: US 7,843,837 B2
(45) Date of Patent: *Nov. 30, 2010

(54) MANAGEMENT OF PROTOCOL INFORMATION IN PNNI HIERARCHICAL NETWORKS

(75) Inventors: Laurent Frelechoux, Lausanne (CH); Michael Osborne, Au (CH)

(73) Assignee: International Business Machines Corporation, Armonk, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 12/134,422

(22) Filed: Jun. 6, 2008

(65) Prior Publication Data
US 2008/0273544 A1 Nov. 6, 2008

Related U.S. Application Data

(63) Continuation of application No. PCT/IB01/02598, filed on Dec. 20, 2001.

(30) Foreign Application Priority Data
Jan. 4, 2001 (EP) ................... 01100314

(51) Int. Cl.
H04L 12/26 (2006.01)

(52) U.S. Cl. ..................... 370/241; 370/255

(58) Field of Classification Search ................. 370/238, 370/241, 250–252, 254, 255, 257, 258, 396
See application file for complete search history.

(56) References Cited

U.S. PATENT DOCUMENTS

| | | | |
|---|---|---|---|
| 5,265,092 A * | 11/1993 | Soloway et al. | 370/238 |
| 5,687,168 A * | 11/1997 | Iwata | 370/255 |
| 5,831,982 A * | 11/1998 | Hummel | 370/396 |
| 6,333,918 B1 * | 12/2001 | Hummel | 370/238 |
| 6,456,600 B1 * | 9/2002 | Rochberger et al. | 370/255 |
| 6,473,408 B1 * | 10/2002 | Rochberger et al. | 370/255 |
| 6,614,762 B1 * | 9/2003 | Illiadis et al. | 370/252 |
| 7,406,049 B2 * | 7/2008 | Frelechoux et al. | 370/241 |
| 2002/0054572 A1 | 5/2002 | Saleh | |

* cited by examiner

Primary Examiner—Kwang B Yao
Assistant Examiner—Andrew Lai
(74) Attorney, Agent, or Firm—Derek S. Jennings; Anne Vachon Dougherty

(57) ABSTRACT

Described is a method for managing flow of protocol information in a node of a hierarchical network in which the protocol information is communicated between network nodes in topology state elements. The method includes checking topology state elements generated by the node to identify protocol information encapsulated therein, and selectively allowing transmittal of the topology state elements from the node to lower levels of the network based on the protocol information identified.

6 Claims, 3 Drawing Sheets

MANAGEMENT OF PROTOCOL INFORMATION IN PNNI HIERARCHICAL NETWORKS

This application is a continuation of PCT/IB01/02598 filed Dec. 20, 2001, for which a national stage application was filed on Mar. 2, 2004 as U.S. patent application Ser. No. 10/250, 491, now U.S. Pat. No. 7,406,049 with an issue date of Jul. 29, 2008.

FIELD OF THE INVENTION

The present invention relates generally to management of protocol information in PNNI (Private Network-to-Network Interface) networks.

BACKGROUND OF THE INVENTION

Before discussing the invention in more detail, it is useful to consider some background. PNNI is a hierarchical, dynamic link-state routing protocol defined by the ATM Forum for use in ATM networks. The PNNI protocol provides, inter alia, a system for creation and distribution of topology information which determines how individual network nodes "see" the network and thus how nodes communicate. A key feature of the protocol is the ability to cluster groups of switches into "peer groups". The details of each peer group are abstracted into a single "logical group node" (LGN) which is all that can be seen outside of that peer group. One node in each peer group serves as the "peer group leader" (PGL) and represents that peer group as the LGN in the next level up of the hierarchy. This system is applied recursively so that PNNI can hierarchically aggregate network topology information. Reachable addresses, if they are internal to a peer group, may be summarized by a single ATM summary address which is generated by the LGN. The PNNI topology information available to switches is such that each switch sees the details of its own peer group plus the details of any peer group that represents it at a higher level of the PNNI hierarchy. It is this hierarchical topology abstraction that reduces the resources required to support large-scale ATM networks. Another advantage of PNNI is that it is scalable and can therefore be used in large heterogeneous networks.

In PNNI, the topology data and routing information is contained in so-called information groups (IGs). The information groups include data relating to nodes, links and addresses which can be accessed by network devices. The information groups are communicated over PNNI networks in PNNI Topology State Elements (PTSEs). PTSEs are created and distributed by nodes so that each node can maintain a topology database which defines its view of the PNNI network. PTSEs are flooded among neighboring nodes so that each node in a peer group has the same topology database and thus the same view of the network. In the next level up of the hierarchy, however, the peer group topology is abstracted into a single logical node as described above. The LGN generates PTSEs advertising addresses accessible within its child peer group and distributes these to its neighbors in the next level of the hierarchy, but the details of nodes and links within the peer group are lost. PTSEs generated by a LGN in this way are also flooded back down the hierarchy, together with PTSEs received by the LGN from its neighbors, to enable the lower-level nodes to identify their "ancestors" (i.e. their representative nodes at higher levels) and maintain their views of the PNNI topology.

PNNI provides full support for mobility at the ATM layer ("PNNI Addendum for Mobility Extensions v1.0", ATM Forum af-ra-0123.000, April 1999). For example, the PNNI mobility extensions allow a LGN abstracting a mobile ATM network to roam in the PNNI hierarchy of a terrestrial backbone network. Routing information detailing the current location of the mobile network is advertised through regular PNNI, thus enabling the establishment of calls from a terrestrial end-system to an end-system of the mobile network, and vice versa. In addition, ATM networks can be used to carry higher layer protocol information such as IP (Internet Protocol) information. This can conveniently be done by employing an extension to the PNNI protocol known as PAR (PNNI Augmented Routing). PAR is described, for example in "PNNI Augmented Routing (PAR)", af-ra-0104.000, ATM Forum, January 1999. Briefly, PAR allows IP information, which is not related to operation of the ATM network in itself, to be distributed over the network. PAR makes use of the PTSEs discussed above to distribute IP-related information in addition to the ATM topology information. PAR-enabled devices in the network encapsulate IP information in PTSEs which are then distributed in the usual PNNI way. The IP information in these so-called "PAR PTSEs" is opaque to PNNI nodes that are not PAR-enabled, but other PAR-enabled nodes are aware of the format of the IP information in PAR PTSEs. Thus, a PAR-enabled device in the network can communicate IP information over the network by means of PAR PTSEs, and another PAR-enabled device can extract the IP information.

A further extension of the PNNI protocol known as "Proxy-PAR" allows higher layer protocol devices, in particular IP devices such as routers, to communicate IP information over the network without themselves participating in PNNI. Proxy-PAR is also described in "PNNI Augmented Routing (PAR)", af-ra-0104.000, ATM Forum, January 1999. Briefly, Proxy-PAR is a simple exchange protocol which allows the integration of IP devices into ATM networks without the need for the IP devices to run PNNI at all. An IP device can be connected to the network via a PAR-enabled device which is configured as a Proxy-PAR server. The IP device itself is configured as a Proxy-PAR client. In accordance with Proxy-PAR, the Proxy-PAR client can register details of the IP services it supports with the Proxy-PAR server. This information is then encapsulated in PAR PTSEs as previously described and flooded in the network in the usual PNNI way. The Proxy-PAR client can also request the Proxy-PAR server for information on other IP devices connected in the network for which PAR PTSEs have been received by the PAR-enabled device as previously described. In this way, IP information is communicated between IP devices without the devices participating in PNNI.

Through use of PAR and Proxy-PAR as described above, protocol devices, in particular IP devices, can learn about each other via this communication of protocol information over the PNNI network, avoiding the need for manual input in each device of the protocol information needed for configuration of the higher layer protocol topology. For example, IP routers at the edge of an ATM cloud can learn about each other, and manual configuration of the IP adjacencies can be avoided. Further, our copending European Patent Application No. 99115544.1, filed 6 Aug. 1999, discloses mechanisms for dynamic configuration of OSPF (Open Shortest Path First) interfaces in IP routers. Routers in mobile networks, for example, can dynamically configure OSPF interfaces with the OSPF area of other (fixed or mobile) network routers as the mobile network roams and makes new connections.

Whether or not OSPF interfaces are configured dynamically, PAR and Proxy-PAR allow routers to register their protocol information (e.g. IP address, ATM address, OSPF area) with their serving ATM switches which then flood the data throughout the network. Other routers can retrieve this IP information by querying their serving ATM switches. Routers can then exchange routing information to form neighbor relationships, or "peer", in the usual way with other routers they learn about from the information received. The resulting IP topology is shaped by this peering between routers.

In an ideal PNNI network, an entire child peer group can be represented by a single summary address and the LGN. However, in non-ideal PNNI networks, such as networks containing non-aggregated (e.g.: non-summarizable) ATM reachable addresses or networks that use, for example, Proxy-PAR, the PNNI hierarchy causes duplication of information at each level of the hierarchy. This stems from the generation, at the LGN, of non-aggregated information groups and information groups which duplicate information derived from the child peer groups. The contents of these information groups is duplicated and propagated one level higher by repackaging it in a new PTSE. These regenerated PTSEs are flooded horizontally to all of the immediate neighbors of the LGN and flooded downwards into the child peer group of the LGN. Such flooding produces two different PTSEs containing the same information groups. This process occurs at each layer of the hierarchy. It would be clearly desirable to reduce this inefficiency.

SUMMARY OF THE INVENTION

In accordance with the present invention, there is now provided a method for managing flow of protocol information in a node of a hierarchical network in which the protocol information is communicated between network nodes in topology state elements, the method comprising: checking topology state elements generated by the node to identify protocol information encapsulated therein; and, selectively allowing transmittal of the topology state elements from the node to lower levels of the network based on the protocol information identified.

This advantageously prevents the aforementioned duplication of information at multiple levels of a hierarchical network thereby saving database memory, link bandwidth, and protocol processing The selective allowing of transmittal of the topology state elements to lower levels of the network preferably comprises comparing the protocol information identified with a lookup table to determine, based on the protocol information identified, if transmittal of the topology state elements to lower levels of the network is allowed.

In preferred embodiments of the present invention, the network comprises a PNNI network and the topology state elements are PTSEs. However, the present invention is not limited in application to PNNI networks. Other hierarchical network formats may equally benefit from the present invention.

In embodiments of the present invention applicable to PNNI networks, the protocol information for which transmittal to lower levels of the network is disallowed comprises Internal Reachable ATM Address, External Reachable ATM Address, Nodal State Parameter, Uplinks, and PAR Service protocol information, and the protocol information for which transmittal to lower levels of the network is allowed comprises Nodal and Horizontal Link protocol information.

The node may comprise a switch or similar network infrastructure device.

The present invention also extends to a switch for connection to a hierarchical network, the switch comprising control logic for performing a method for managing flow of protocol information as herein before described.

BRIEF DESCRIPTION OF THE DRAWINGS

Preferred embodiments of the invention will now be described, by way of example, with reference to the accompanying drawings in which.

DETAILED DESCRIPTION OF THE INVENTION

A preferred embodiment of the present invention will be described shortly. Before describing operation of the embodiment, particular problems addressed by the embodiment will be explained with reference to FIGS. 1 and 2.

Figure 1:
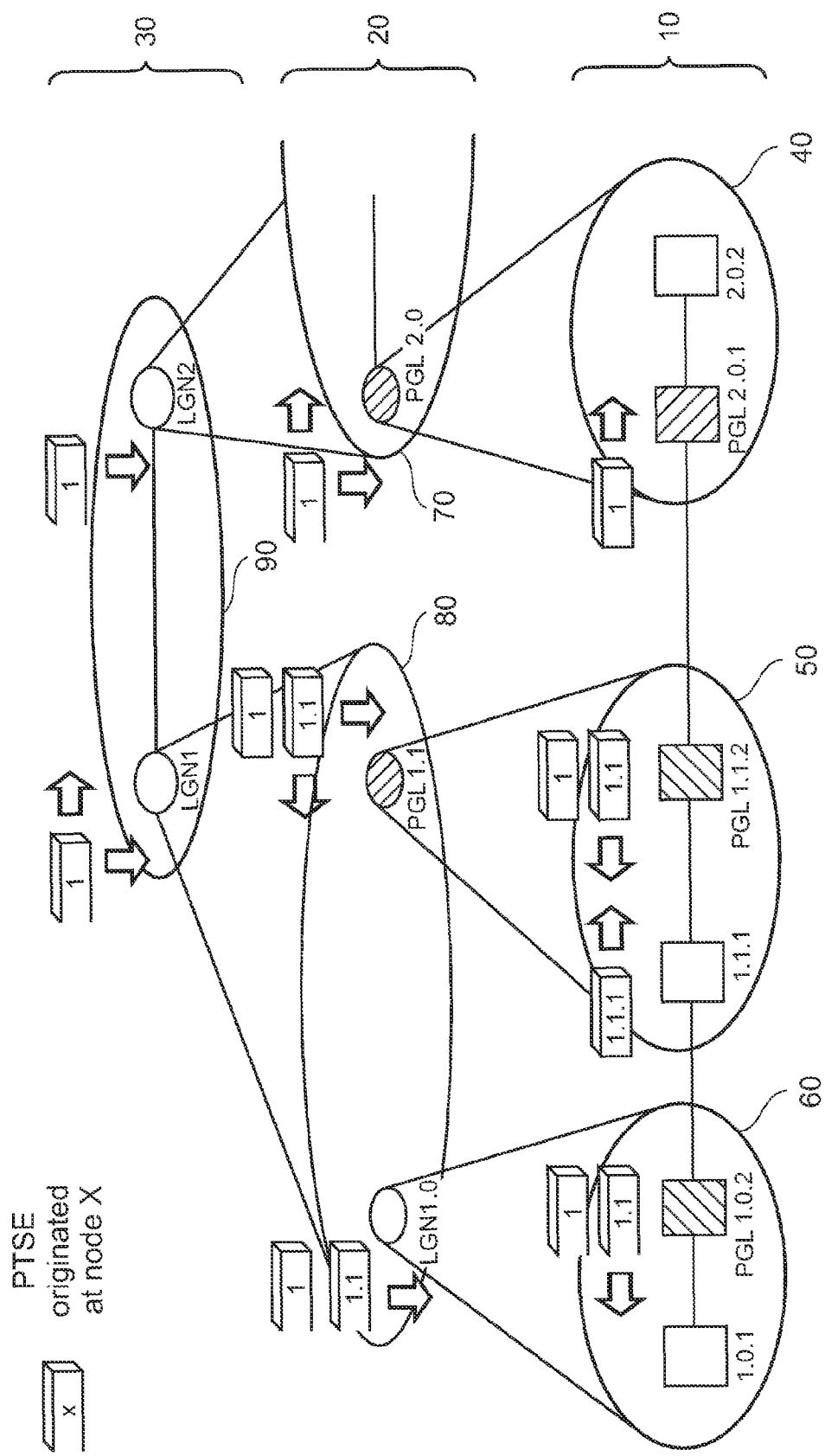
FIG. 1 is a block diagram of a PNNI network hierarchy.

Referring first to FIG. 1, this shows a representative PNNI hierarchical network comprising three levels, 10, 20 and 30. Level 10 comprises 3 peer groups, 40 to 60. Level 20 comprises two peer groups, 70 and 80. Level 30 comprises a single peer group 90. Peer group 60 comprises nodes 1.0.1 and 1.0.2, with node 1.0.2 serving as being the PGL. Peer group 50 comprises nodes 1.1.1 and 1.1.2, with node 1.1.2 serving as the PGL. Peer group 40 comprises nodes 2.0.1 and 2.0.2, with node 2.0.1 serving as the PGL. Peer group 70 comprises PGL 2.0 representing peer group 40. Peer group 80 comprises LGN 1.1 representing peer group 50 and LGN 1.0 representing peer group 60. LGN 1.1 serves as the PGL in peer group 70. Peer group 90 comprises LGN 2 representing peer group 70 and LGN 1 representing peer group 80. In practice, Nodes 1.01, 1.0.2, 1.1.1, 1.1.2, 2.0.1, 2.02, may each be implemented by an ATM switch or similar devices. An example of such a switch will be described later with reference to Figure X. Nodes 1.0.2 and LGN 1.0 are implemented in the same switch. Likewise, nodes 1.1.2, 1.1 and 1 are implemented in the same switch. Similarly, nodes 2.01, 2.0 and 2 are implemented in the same switch.

Figure 2:
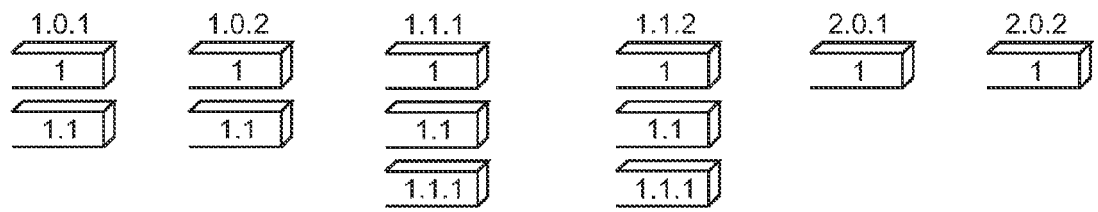
FIG. 2 is a table of PTSEs stored in switches of the PNNI network.

As mentioned earlier, the PNNI protocol is based on a rule that, when a node originates a PTSE, the PTSE is flooded from the node horizontally and downwards through the PNNI hierarchy. A node in the lowest level of the hierarchy therefore has a copy of all the PTSEs originated by the nodes that are visible within its hierarchy, including PTSEs generated by its ancestor's nodes. For example, a PTSE originated by LGN 1 is flooded down to PGL 1.1 and also flooded horizontally to LGN 2. In turn, LGN 2 floods the PTSE down to PGL 2.0. PGL 1.1 and PGL 2.0 in turn flood the PTSE horizontally and downwards through the hierarchy. By way of example, suppose that node 1.1.1 generates a PTSE 1.1.1 containing an information group that cannot be summarized as it is passed through the hierarchy. An example of such an information group is an Exterior Reachable ATM address information group. PTSE 1.1.1 is flooded in the bottom peer group to PGL 1.1.2. From this PTSE, LGN/PGL 1.1 generates a new PTSE 1.1 with the same information group. The new PTSE 1.1 is flooded by LGN/PGL 1.1 horizontally to LGN 1.0 and down to PGL 1.1.2. Recursively, LGN 1 generates a new PTSE 1 with, again, the same information group. PTSE 1 is then flooded by LGN 1 horizontally to LGN 2 and down to PGL 1.1 where it is further flooded horizontally to LGN 1.0 and down to PGL 1.1.2. The result of the flooding of non-summarizable information groups is illustrated in FIG. 2. Specifically, FIG. 2 shows the PTSEs stored in each switch, 1.0.1 to 2.0.2, that contains the same Exterior Reachable ATM address information group. Each switch comprises a PNNI database stored in a memory. Node 1.1.1, the source of the non-summarizable information group, stores, in its PNNI database, three PTSEs each containing the same information group. The first stored PTSE was generated by node 1.1.1; the second PTSE was generated by LGN/PGL 1.1; and, the third PTSE was generated by LGN 1.

Figure 3:
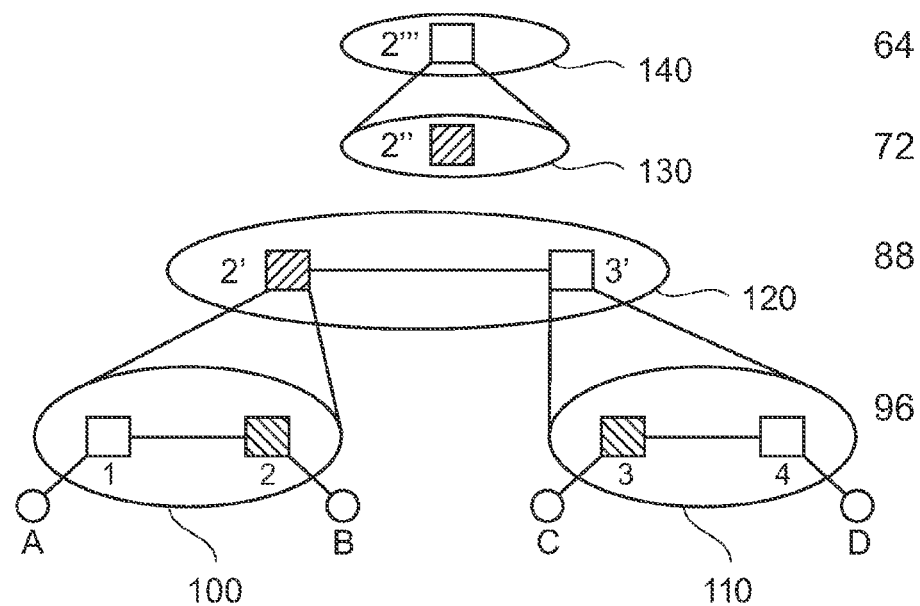
FIG. 3 is a block diagram of another PNNI network hierarchy.

Referring now to FIG. 3, this shows another PNNI hierarchy comprising four levels, 64, 72, 88, and 96. Level 96, the lowest level, comprises two peer groups, 100 and 110. Level 88 comprises a single one peer group 120. Likewise, level 72 comprises a single peer group 130 and level 64, the uppermost level, comprises a single peer group 140. Peer group 100 comprises two switches, 1 and 2. Peer group 110 also comprises two switches, 3 and 4. A router A is connected to switch 1 and another router B is connected to switch 2. Likewise, a router C is connected to switch 3 and another router D is connected to switch 4. At the lowest level 96, switch 2 serves as the PGL in peer group 100 and switch 3 serves as the PGL in peer group 110. At the next level 88 of the hierarchy, in peer group 120, peer group 100 is represented by LGN 2' and peer group 110 is represented by LGN 3'. LGN 2' serves as the PGL in peer group 120. At the next level 72, peer group 120 is represented by LGN 2" in peer group 130. LGN 2" serves as the PGL in peer group 130. At the uppermost level 64, peer group 130 is represented in peer group 140 by LGN 2'''. Nodes 2, 2', 2", and 2''' are all implemented in the same switch 2. Suppose that PNNI Augmented Routing (PAR) PTSEs are originated in this hierarchy. Specifically, suppose that each router, A, B, C and D, registers a non-summarizable information group such as a PAR Service Descriptions information group with a flooding scope 64. Each switch, 1, 2, 3 and 4, therefore generates a PAR PTSE containing the PAR Service Descriptions information group of its attached router A, B, C, and D. Table 1 below shows information groups recorded in each switch at each level of the hierarchy.

width by flooding $A^{2'}$, $A^{2''}$ and $A^{2'''}$, and adds additional protocol processing demands.

Generally, in a conventional PNNI network of N levels, a switch that is the source of an information group must store up to N PTSEs containing the same information group if the information is not summarized with other information groups and advertised at the top of the hierarchy. An example of such a non-summarizable PTSE is a PAR PTSE. PAR PTSEs are not summarized as they are passed up through a PNNI hierarchy.

In a preferred embodiment of the present invention, there is provided a method for preventing the aforementioned regeneration of information thereby saving database memory, link bandwidth, and protocol processing. The method is based on a realization that many information groups generated by a LGN duplicate information already contained in a child node. These duplicated information groups are not necessary for PNNI functionality in nodes contained with descendent peer groups.

According to the method, a non-summarizable PTSE is allowed to flood from an originating node to neighbor nodes in the same peer group. However, the non-summarizable PTSE is prevented from flooding down into a child peer group of the originating node. Only non-summarizable PTSEs originated by a node are affected. Non-summarizable PTSEs received neighbor from nodes are still flooded down into the child peer group. Table 2 below illustrates the information groups stored in each switch at each level of the hierarchy of FIG. 3 according to this method.

TABLE 2

| | Switch 1 | Switch 2 | Switch 3 | Switch 4 |
|---|---|---|---|---|
| Level 96 | $A^1, B^2$ | $A^1, B^2$ | $C^3, D^4$ | $C^3, D^4$ |
| Level 88 | $C^{3'}, D^{3'}$ | $A^{2'}, B^{2'}, C^{3'}, D^{3'}$ | $A^{2'}, B^{2'}, C^{3'}, D^{3'}$ | $A^{2'}, B^{2'}$ |
| Level 72 | | $A^{2''}, B^{2''}, C^{2''}, D^{2''}$ | | |
| Level 64 | | $A^{2'''}, B^{2'''}, C^{2'''}, D^{2'''}$ | | |

TABLE 1

| | Switch 1 | Switch 2 | Switch 3 | Switch 4 |
|---|---|---|---|---|
| Level 96 | $A^1, B^2$ | $A^1, B^2$ | $C^3, D^4$ | $C^3, D^4$ |
| Level 88 | $A^{2'}, B^{2'}, C^{3'}, D^{3'}$ | $A^{2'}, B^{2'}, C^{3'}, D^{3'}$ | $A^{2'}, B^{2'}, C^{3'}, D^{3'}$ | $A^{2'}, B^{2'}, C^{3'}, D^{3'}$ |
| Level 72 | $A^{2''}, B^{2''}, C^{2''}, D^{2''}$ | $A^{2''}, B^{2''}, C^{2''}, D^{2''}$ | $A^{2''}, B^{2''}, C^{2''}, D^{2''}$ | $A^{2''}, B^{2''}, C^{2''}, D^{2''}$ |
| Level 64 | $A^{2'''}, B^{2'''}, C^{2'''}, D^{2'''}$ | $A^{2'''}, B^{2'''}, C^{2'''}, D^{2'''}$ | $A^{2'''}, B^{2'''}, C^{2'''}, D^{2'''}$ | $A^{2'''}, B^{2'''}, C^{2'''}, D^{2'''}$ |

In Table 1 above, $A^1$ represents, for example, the ATM reachable address A generated by switch 1. $A^2$ represents the same ATM reachable address that has been regenerated by the LGN 2' in switch 2 at level 88. Likewise, $A^{2''}$ represents the same ATM reachable address that has been regenerated by the LGN 2" in switch 2 at level 72. Similarly, $A^{2'''}$ represents the same reachable ATM address that has been regenerated by the LGN 2''' at level 64. ATM reachable addresses B, C and D are similarly regenerated. In the switches, 1, 2, 3, and 4, such regeneration imposes a storage overhead, consumes band- Referring to Table 2 above, switch 1 no longer receives $A^{2'}$, $B^{2'}$ from PGL 2 because, according to the method, these are prevented from flooding down from level 88. Similarly, switch 1 no longer receives $A^{2''}$, $B^{2''}$, $C^{2''}$, $D^{2''}$ because these are prevented from flooding down from level 72. Likewise, switch 4 no longer receives $A^{2'''}$, $B^{2'''}$, $C^{2'''}$, $D^{2'''}$ because these are prevented from flooding down from level 64. Switches 3 and 4 no longer receive $A^{2''}$, $B^{2''}$, $C^{2''}$, $D^{2''}$ and $A^{2'''}$, $B^{2'''}$, $C^{2'''}$, $D^{2'''}$ via PGL 3' because these are prevented from flooding down from levels 72 and 64 respectively.

A mentioned earlier, one example of a non-summarizable PTSE is a PAR PTSE. Other examples include: Internal Reachable Address information groups, External Reachable Address information groups, Nodal State Parameter information groups, and Uplink information groups. In preferred embodiments of the present invention, subsequent flooding of these information groups by an LGN is confined only to peers of the LGN and does not extend into descendent peer groups via the PGL.

Figure 4:
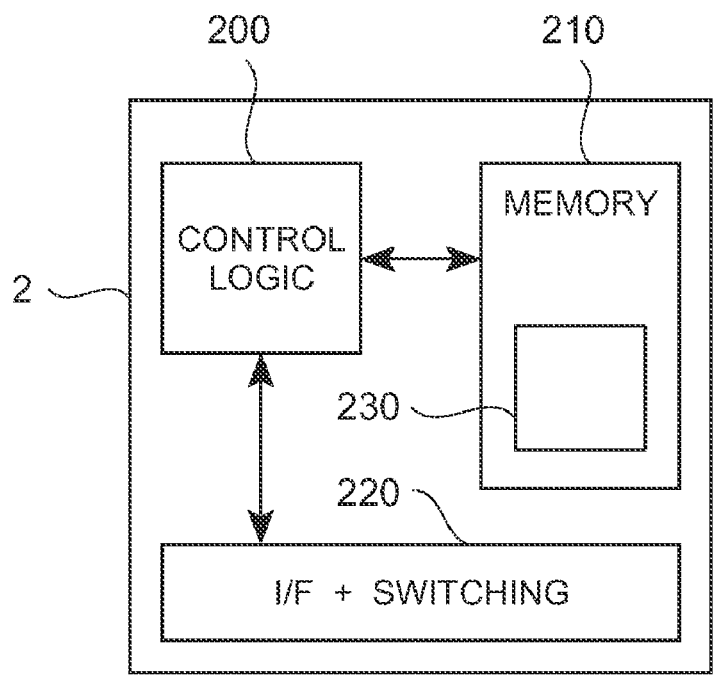
FIG. 4 is a schematic block diagram of a switch and associated router embodying the invention; and, FIG. 5 is a flow diagram of a method for managing flow of protocol information in a PNNI network in accordance with a preferred embodiment of the present invention.

An example of a switch node embodying the present invention will now described with reference to FIG. 4. FIG. 4 is a simplified schematic illustrating the main elements of such the switch node. Such a switch node may be employed in the implementation of switches 1, 2, 3, and 4. The switch node comprises control logic 200, memory 210 and circuitry 220 comprising the interfaces and switching circuitry via which the device communicates with the rest of the network. The switch node may be a PAR-enabled device acting as a Proxy-PAR server for a connected router. The switch control logic 200 controls operation of the device generally, and implements the usual PNNI, PAR and Proxy-PAR functions. In addition, the control logic 200 performs the aforementioned method for preventing duplication of information. To facilitate performance of such a method, a look up table 230 is stored in the memory 210. An example of such a look up table 230 is presented in Table 3 below. In operation, the control logic 200 refers to the look up table 230 to determine whether or not a PTSE created by the control logic 200 can be disseminated downwardly through the PNNI hierarchy based on the type of information contained in the PTSE. In accordance with PNNI, control logic 200 maintains a topology database in the memory 210 containing data defining the device's view of the network topology as described above, together with a PTSE repository in which PTSEs received from the network are stored until either they expire or are flushed by the usual PNNI processes.

TABLE 3

| INFORMATION GROUP | PASS DOWN? |
| --- | --- |
| Internal Reachable ATM Address | NO |
| External Reachable ATM Address | NO |
| Nodal State Parameter | NO |
| Uplinks | NO |
| PAR Service | NO |
| Nodal | YES |
| Horizontal Link | YES |

Figure 5:
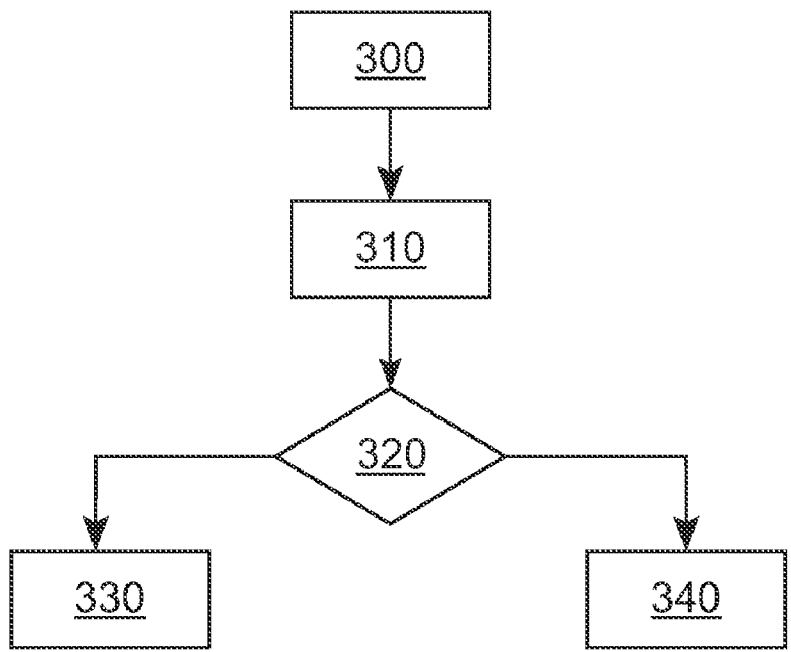

Referring now to FIG. 5, in operation, at step 300, the control logic 200 generates a PTSE in the memory 210. At step 310, the control logic checks the PTSE to identify the protocol information therein. Alternatively, the protocol information check may be performed by the control logic 200 If, at step 320, the control logic 200 determines that the protocol information comprises Internal Reachable ATM Address, External Reachable ATM Address, Nodal State Parameter, Uplinks, or PAR Service protocol information, then, at step 330, flooding, in other words transmittal, of the PTSE to lower levels of the network is prevented by the control logic 200. The aforementioned look up table 230 is employed by the control logic 200 making this determination. However, if, at step 320, the control logic determines that the protocol information comprises Nodal or Horizontal Link protocol information then, at step 340, the control logic 200 allows flooding of the PTSE to lower levels of the network. It will be appreciated therefore that the look up table serves as a filter for preventing information group regenerated in higher levels in the PNNI network from flooding down into lower levels of the PNNI network in which the information groups are already available.

In general, the control logic 200 may be implemented in hardware or software, or a combination thereof, but will typically be implemented by a processor running software which configures the processor to perform the functions described, and suitable software will be apparent to those skilled in the art from the description herein. (Of course, while processors in the switch node may be preconfigured with appropriate software, the program code constituting such software could be supplied separately for loading in the devices to configure the processors to operate as described. Such program code could be supplied as an independent element or as an element of the program code for a number of control functions, and may be supplied embodied in a computer-readable medium such as a diskette or an electronic transmission sent to a network operator).

The invention claimed is:

1. A switch for connection to a hierarchical network, the switch comprising control logic for performing a method for managing flow of protocol information in a node of the hierarchical network in which the protocol information is communicated between network nodes in topology state elements, the switch comprising:
   a checking component for checking topology state elements generated by the node to identify protocol information encapsulated therein; and
   a transmitting component for selectively allowing transmittal of the topology state elements from the node to lower levels of the network based on the protocol information identified,
   wherein the network comprises a PNNI network and the topology state elements are PTSEs and wherein the protocol information for which transmittal to lower levels of the network is disallowed comprises Internal Reachable ATM Address, External Reachable ATM Address, Nodal State Parameter, Uplinks, and PAR Service protocol information.

2. The switch as claimed in claim 1, wherein the selective allowing of transmittal of the topology state elements to lower levels of the network comprises comparing the protocol information identified with a lookup table to determine, based on the protocol information identified, if transmittal of the topology state elements to lower levels of the network is allowed.

3. The switch as claimed in claim 1, wherein the protocol information for which transmittal to lower levels of the network is allowed comprises Nodal and Horizontal Link protocol information.

4. A non-transitory computer readable medium readable by a digital processing apparatus and storing program instructions which are tangibly embodied on a storage device and which are executable by the processing apparatus to perform a method for managing flow of protocol information in a node of a hierarchical network in which the protocol information is communicated between network nodes in topology state elements, the method comprising:
   checking topology state elements generated by the node to identify protocol information encapsulated therein; and,
   selectively allowing transmittal of the topology state elements from the node to lower levels of the network based on the protocol information identified,
   wherein the network comprises a PNNI network and the topology state elements are PTSEs and wherein the protocol information for which transmittal to lower levels of the network is disallowed comprises Internal Reachable ATM Address, External Reachable ATM Address, Nodal State Parameter, Uplinks, and PAR Service protocol information.

5. The non-transitory computer readable medium as claimed in claim 4, wherein the selective allowing of transmittal of the topology state elements to lower levels of the network comprises comparing the protocol information identified with a lookup table to determine, based on the protocol information identified, if transmittal of the topology state elements to lower levels of the network is allowed.

6. The non-transitory computer readable medium as claimed in claim 4, wherein the protocol information for which transmittal to lower levels of the network is allowed comprises Nodal and Horizontal Link protocol information.

* * * * *